Figure 4:
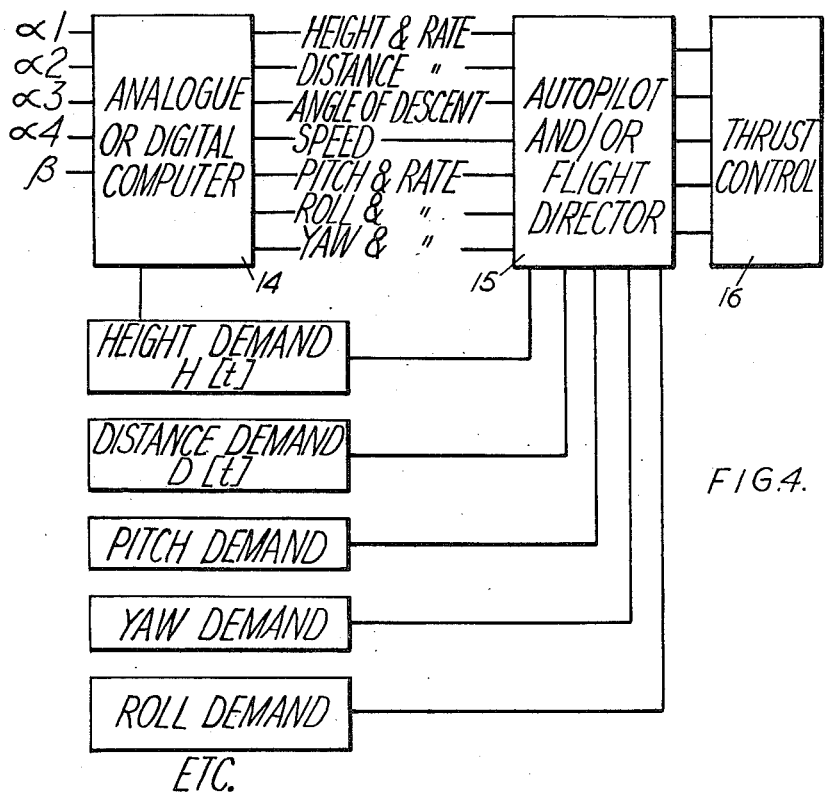

July 31, 1962
A. A. GRIFFITH ETAL
3,047,256
NAVIGATION DEVICE FOR AIRCRAFT
Filed Oct. 21, 1959
2 Sheets-Sheet 1
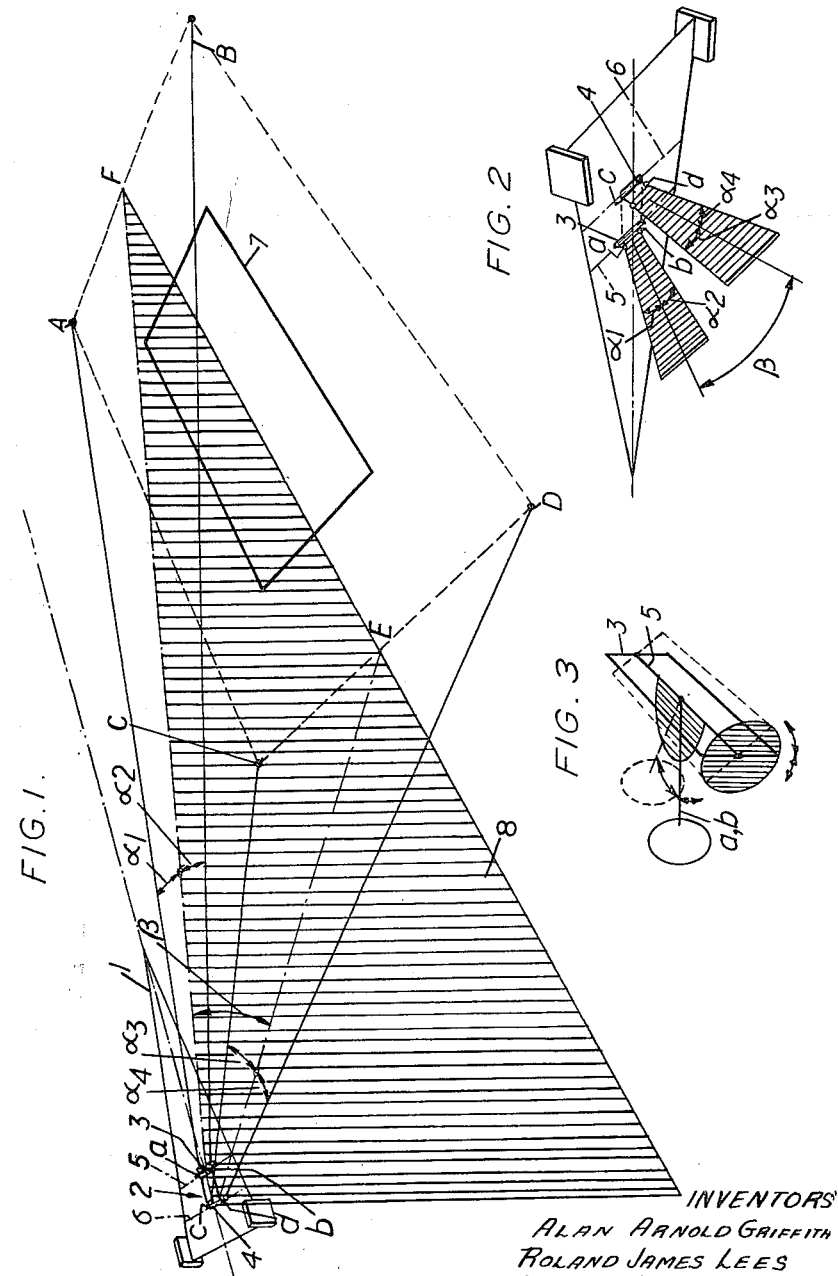
INVENTORS
ALAN ARNOLD GRIFFITH
ROLAND JAMES LEES
RONALD ANDREW SHAW
REGINALD WILLIAM WILLMER
By
Cushman, Darby & Cushman
Attorneys INVENTORS
ALAN ARNOLD GRIFFITH
ROLAND JAMES LEES
RONALD ANDREW SHAW
REGINALD WILLIAM WILLMER
By
Cushman, Darby & Cushman
Attorneys

United States Patent Office 3,047,256
Patented July 31, 1962

3,047,256
NAVIGATION DEVICE FOR AIRCRAFT
Alan Arnold Griffith, Derby, and Roland James Lees, Ronald Andrew Shaw, and Reginald William Willmer, Strand, London, England, assignors to Rolls-Royce Limited, Derby, England, a British company
Filed Oct. 21, 1959, Ser. No. 847,742
Claims priority, application Great Britain Oct. 23, 1958
6 Claims. (Cl. 244—77)

This invention concerns navigation devices for aircraft, e.g. for the landing and take-off of aircraft, and, although it is not so restricted, is more particularly concerned with navigation devices for assisting the landing of vertical take-off aircraft.

The object of the invention is to make it possible for an aircraft to land safely and swiftly on or to take off safely and swiftly from an airfield, landing pad or like area in conditions of complete visual blackout. Thus the object of the invention is to avoid the expense and passenger annoyance caused by the diversion of the aircraft, in bad flying conditions, to another landing area and to enable landing and take-off to be effected in the minimum time so that, in the case of vertical take-off aircraft, the consumption of fuel as a result of hovering is reduced to its minimum.

According to one aspect of the invention there is provided a navigation device adapted to be mounted on an aircraft, said device comprising a plurality of aerials each of which is adapted to receive a characteristic signal emanating from one only of a corresponding plurality of transmitters which are arranged on the ground at known positions, means, responsive to said signals, for orientating each aerial in a predetermined direction relative to its respective transmitter, and means controlled by the angular positions of the aerials for indicating and/or controlling the position of the aircraft in space with respect to said transmitters.

Preferably each aerial is adapted to orientate itself in the direction in which its characteristic signal is received most or least strongly.

The said characteristic signals could be coded pulses which are simultaneously transmitted by the transmitters and it should be understood that the phrase "simultaneously transmitted," as used in this specification, is intended to be broad enough to cover the case in which pulses of the various signals are intercalated with each other. Normally, however, each of the transmitters would transmit signals having a characteristic frequency differing from that of the other transmitter or transmitters, the respective aerials being tuned to said frequencies.

In a preferred embodiment of the invention, a navigation device comprises at least three aerials each of which is adapted to receive a characteristic signal emanating from one only of a corresponding number of transmitters which are arranged on the ground at known positions along two known lines, means, responsive to said signals, for orientating each aerial in a predetermined direction relative to its respective transmitter, means controlled by the angular positions of the aerials when so orientated for measuring the angle subtended at the aircraft by a given line extending between said known lines and for measuring the angles at the aircraft between a reference plane (e.g. the aircraft vertical plane) and two or more of the transmitters arranged along one of said known lines, and means controlled by the value of said angles for indicating and/or controlling the position of the aircraft in space with respect to the transmitters. Preferably the said known lines are parallel to each other and the said given line extends perpendicular to the said known lines.

The navigation device may comprise two rotatable frames, each frame being provided with two aerials which are rotatable, independently of each other, about two axes which are respectively parallel to and at right angles to the axis of the respective frame.

Preferably also the navigation device comprises information storage means which stores information concerning the required angular positions of the aerials, determined as functions of time, along a predetermined flight path, the means for indicating and/or controlling the position of the aircraft serving in operation to compare the actual angular positions of the aerials at any instant with the stored information as to the required angular positions thereof.

The invention also includes within its scope an aircraft provided with a navigation device as set out above.

Figure 5:
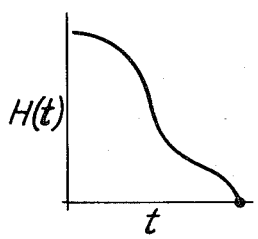
Figure 6:
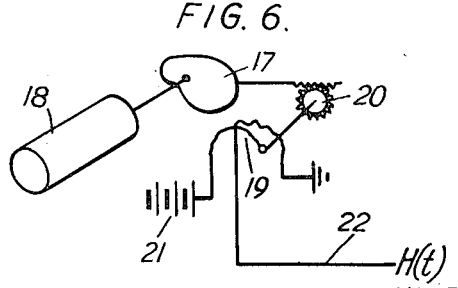

The invention is illustrated, merely by way of example in the accompanying drawings in which:

FIGURE 1 is a view from above and FIGURE 2 is a view from below of an aircraft provided with a navigation device according to the invention, FIGURE 3 illustrates on a larger scale a part of said navigation device, FIGURE 4 illustrates another part of the said navigation device, FIGURE 5 is a graph illustrating the desired height of the aircraft with respect to time as the aircraft comes in to land, and FIGURE 6 illustrates a device for producing an electrical signal corresponding to the desired height of the aircraft at any moment.

Referring to the drawings, a vertical take-off aircraft 1 has mounted on and beneath it a navigation device, generally indicated at 2, comprising a spaced pair of frames 3, 4. The frames 3, 4 are rotatable about parallel axes 5, 6 respectively which extend transversely of the aircraft 1. The frame 3 is provided with a pair of aerials $a$, $b$ (only one of which, for purposes of clarity, is shown in FIGURE 3), the aerials $a$, $b$ being rotatable independently of each other about two axes which are respectively parallel to and at right angles to the axis 5. Similarly the frame 4 is provided with a pair of aerials $c$, $d$ which are rotatable independently of each other about axes at right angles to the frame 4. The aerials $a$, $b$, $c$, $d$ are respectively adapted to receive characteristic signals from transmitters which are not shown but which are disposed at known points A, B, C, D on the ground. The points A, B, C, D are arranged at the corners of a rectangle within which is disposed a landing pad 7, the aerials $a$–$d$ being arranged at the corners of a similar rectangle. The size of the rectangle constituted by the aerials $a$–$d$ is arranged to be as small as the size of the aerials and their amplitudes of rotation will permit.

Each transmitter is arranged to transmit signals on a characteristic micro-wave frequency which differs from the frequencies of the other transmitters, each aerial being tuned to receive signals at the frequency of its respective transmitter only. Each of the aerials $a$–$d$ is a "lock-follow aerial," i.e. it is adapted to be rotated into and to remain in an angular position in which the signals from its respective transmitter is received least or most strongly. The frames 3, 4 and aerials $a$–$d$ are rotatable by motors (not shown) which are controlled in response to the aerial signals so that, in equilibrium, the axes of the aerials point to their respective transmitters.

When the aerials are locked on their respective transmitters, the angles made by the longitudinal axes of the aerials $a$–$d$ with the aircraft vertical plane 8 are shown as $\alpha_1$, $\alpha_2$, $\alpha_3$, and $\alpha_4$ respectively. Moreover, when the aerials are so locked, the frames 3, 4 are disposed at an angle $\beta$ to each other. $\beta$ is thus the angle subtended at the aircraft by a given line EF which extends between and is perpendicular to the lines AB, CD.

In making an approach and landing, the aircraft is taken by the en route navigational means along a compass course lying in the vertical plane 8 to a point corresponding approximately to the desired start of the approach. The range of the transmitters should be sufficient to enable the aerials to be locked on before this point is reached, so that errors of the en route navigation can be corrected. The aircraft is then caused to sideslip until $\alpha_1 = \alpha_2$ and $\alpha_3 = \alpha_4$. When this occurs the aircraft will be flying in the vertical plane 8 which, as will be seen, bisects the sides A, B and C, D of the rectangle. If the condition that $\alpha_1 = \alpha_2$ and $\alpha_3 = \alpha_4$ can be maintained throughout the approach, then the aircraft will touch down at zero transverse ground speed.

It may be shown that the slant range of the midpoint of the line $a$, $b$ from the mid-point of the line A, B is equal to $$\tfrac{1}{2}(AB - ab) \cot \tfrac{1}{2}(\alpha_1 + \alpha_2)$$

Since AB and $ab$ are known, the position of the aircraft will be given by determining the angles $\alpha_1$, $\alpha_2$ and $\beta$ (or, of course, alternatively, by determining the angles $\alpha_3$, $\alpha_4$ and $\beta$). It will therefore be appreciated that the necessary information as to the position of the aircraft can be obtained from any three of the aerials and transmitters, with the result that if one of the transmitters (or aerials) should go out of operation this will not matter.

Thus the prescribed flight path may be completely specified by expressing the angle $\beta$ as a function either of $(\alpha_1 + \alpha_2)$ or of $(\alpha_3 + \alpha_4)$. Additionally specification of the time derivative $$\frac{d}{dt}(\alpha_1 + \alpha_2)$$

as the appropriate function of $(\alpha_1 + \alpha_2)$ ensures that each element of the approach path is traversed with the prescribed velocity. The use of the variables $(\alpha_1 + \alpha_2)$ and $(\alpha_3 + \alpha_4)$—as opposed to the variables $2\alpha_1$, or $2\alpha_3$—ensures that small departures from the prescribed vertical plane of the approach will not matter.

A standard approach and landing is worked out to suit the control properties of the aircraft and the corresponding angular positions of the aerials, during the approach and landing, are determined as functions of time. The naviagation device 2 is provided with means for storing this information e.g. magnetically on tape or mechanically on cams. Thus the prescribed values of $\beta$ and $$\frac{d}{dt}(\alpha_1 + \alpha_2)$$

as functions of $(\alpha_1 + \alpha_2)$, may be stored on cams fixed to a shaft whose rotation is proportional to $(\alpha_1 + \alpha_2)$. Preferably a third cam is provided which stores the prescribed values of $$\frac{d\beta}{dt}$$

Means are provided for continuously comparing these values with the actual values in flight of $$\frac{d}{dt}(\alpha_1 + \alpha_2)$$

$\beta$, and $$\frac{d\beta}{dt}$$

and the differences are employed as error signals by means of which appropriate control demands are made on the automatic pilot of the aircraft to correct the flight path and speed.

For this purpose the aircraft must have two independent controls operating in the vertical plane of the approach path. In a jet-lift aircraft, for instance, the two controls operate on the magnitude and the direction of the jet thrust. In general, the required demand on each control is the sum of three terms derived from the three error signals by suitable multiplying coefficients. With the help of control systems theory, the values of these coefficients can be computed from the properties of the prescribed approach and landing run together with the control properties of the aircraft. If these coefficients are functions of $(\alpha_1 + \alpha_2)$, information about their variation can be stored on additional cams.

In like manner, information about the corresponding variables is stored in cams fixed to a shaft whose rotation is proportional to $(\alpha_3 + \alpha_4)$. Control of the aircraft is transferred to this latter set of cams, if the former set becomes ineffective through the failure of either of the aerials $a$, $b$ to remain locked on to its transmitter.

The angular velocities of the aerials provide, of course, an indication of the changing velocity of the aircraft and when the signals received by the aerials are all zero and the aerials are all in their neutral or zero positions the aircraft is in its correct landing position.

In an automatic landing, the correcting demands are made on the automatic pilot as discussed above. For manual operation, the necessary information may be presented to the pilot in known manner through a flight director. The controls are then operated so as to bring the indicators of the flight director to zero.

If desired, a mechanism as shown in FIGURE 4 may be employed which is controlled by the angular positions of the aerials $a$, $b$, $c$, $d$, and which is adapted to indicate and/or control the position of the aircraft in space with respect to the transmitters A, B, C. D.

The mechanism of FIGURE 4 comprises a computer 14 which may be an analogue or a digital computer, and which is arranged to be fed as shown with the measured values of $\alpha_1$, $\alpha_2$, $\alpha_3$, $\alpha_4$, $\beta$, and with a height demand H($t$). From this information the computer produces signals representing the actual height of the aircraft and the rate of change of height, the actual distance of the aircraft from the landing pad 7 and the rate of change of said distance, the angle of descent of the aircraft, its speed, its pitch and rate of change of pitch, and its roll and yaw and rates of change thereof. All these signals are fed to an auto-pilot and/or flight director 15 which is also fed with the height demand H($t$), and distance demand D($t$), pitch, yaw and roll demands, and any other desired demand signals. The auto-pilot and/or flight director 15 compares the computer signals with the demand signals and produces outputs which are fed to a thrust control 16.

The demand signals employed in the mechanism of FIGURE 4 may be produced automatically or may be set by the pilot. Thus, for instance, the height demand H($t$) may be produced by the device illustrated in FIGURE 6 which comprises a cam 17 driven by a motor 18, the cam 17 being arranged to adjust a variable resistance 19 through a rack and pinion device 20. The variable resistance 19 is supplied with current from a battery 21 and is connected to a lead 22. The signals carried by the lead 22 will therefore depend upon the setting of the cam 17. The shape of the latter is made such that the output from the lead 22 will vary with time in accordance with the curve shown in FIGURE 5. In FIGURE 5, the ordinate represents H($t$) and the abscissa time ($t$). Accordingly, FIGURE 5 shows how the desired height of the aircraft changes with time as the aircraft comes into land.

We claim:

1. A navigation device adapted to be mounted on an aircraft, said device comprising at least three detection means including universally rotatable aerials each of which is adapted to receive a characteristic signal emanating from one only of a corresponding number of transmitters which are arranged on the ground at known positions along two known lines, means to orientate each aerial in a predetermined direction relative to its respective transmitter, means controlled by the angular positions of the aerials when so orientated for measuring the angle subtended at the aircraft by a given line extending between said known lines and for measuring the angles at the aircraft between a reference plane and at least two of the transmitters arranged along one of said known lines, and means controlled by the value of said angles for establishing the three dimensional position of the aircraft in space with respect to the transmitters.

2. A navigation device adapted to be mounted on an aircraft, said device comprising at least three detecting means including unversally rotatable aerials each of which is adapted to receive a characteristic signal emanating from one only of a corresponding number of transmitters which are arranged on the ground at known positions along two known parallel lines, means to orientate each aerial in a predetermined direction relative to its respective transmitter, means controlled by the angular positions of the aerials when so orientated for measuring the angle subtended at the aircraft by a given line extending perpendicular to said known lines and for measuring the angle at the aircraft between a reference plane and at least two of the transmitters arranged along one of said known lines and means controlled by the value of said angles for controlling the three dimensional position of the aircraft in space with respect to the transmitters.

3. A navigation device adapted to be mounted on an aircraft, said device comprising two rotatable frames and two aerials on each frame which are rotatable, independently of each other, about two axes which are respectively parallel to and at right angles to the axis of the respective frame, means including each aerial adapted to receive a characteristic signal emanating from one only of four transmitters which are arranged on the ground at known positions along two known lines, means to orientate each aerial in a predetermined direction relative to its respective transmitter, means controlled by the angular positions of the aerials when so orientated for measuring the angle subtended at the aircraft by a given line extending between said known lines and for measuring the angles at the aircraft between a reference plane and two of the transmitters arranged along one of said known lines, and means controlled by the value of said angles for establishing the three dimensional position of the aircraft in space with respect to the transmitters.

4. A navigation device adapted to be mounted on an aircraft, said device comprising at least three detection means including universally rotatable aerials each of which is adapted to receive a characteristic signal emanating from one only of a corresponding number of transmitters which are arranged on the ground at known positions along two known lines, means to orientate each aerial in a predetermined direction relative to its respective transmitter, means controlled by the angular positions of the aerials when so orientated for measuring the angle subtended at the aircraft by a given line extending between said known lines and for measuring the angles at the aircraft between a reference plane and at least two of the transmitters arranged along one of said known lines, information storage means which stores information concerning the required angular positions of the aerials, determined as functions of time, along a predetermined flight path, and means for establishing the three dimensional position of the aircraft in space, said last-mentioned means serving in operation to compare the actual angular positions of the aerials at any instant with the stored information as to the required angular positions thereof.

5. A navigation device adapted to be mounted on an aircraft, said device comprising two rotatable frames and two aerials on each frame which are rotatable, independently of each other, about two axes which are respectively parallel to and at right angles to the axis of the respective frame, means including each aerial adapted to receive a characteristic signal emanating from one only of four transmitters which are arranged on the ground at known positions along two known parallel lines, each aerial being adapted to orientate itself in a predetermined direction relative to its respective transmitter, means controlled by the angular positions of the aerials when so orientated for measuring the angle subtended at the aircraft by a given line extending perpendicular to said known lines and for measuring the angles at the aircraft between the aircraft vertical plane and at least two of the transmitters arranged along one of said known lines, information storage means which stores information concerning the required angular positions of the aerials, determined as functions of time, along a predetermined flight path, and means for controlling the position of the aircraft in space, said last-mentioned means serving in operation to compare the actual angular positions of the aerials at any instant with the stored information as to the required angular positions thereof.

6. A navigation device adapted to be mounted on mobile craft for establishing the three-dimensional position of the craft with respect to at least three spaced apart non-colinear transmitters at known positions on the ground and each radiating a distinguishable signal, which apparatus comprises: means including at least three universally rotatable directional aerials each adapted to receive and detect a respective one of said signals, means for moving each aerial to have a predetermined positional relationship to its incoming signal, means for establishing the directions of reception with respect to each other of the respective signals from their transmitters, and means responsive to the direction establishing means for establishing an indication of said three-dimensional position.

References Cited in the file of this patent
UNITED STATES PATENTS

| | | |
|---|---|---|
| 2,137,847 | Libman | May 16, 1936 |
| 2,379,362 | Lear | Aug. 25, 1939 |
| 2,406,953 | Lewis | Sept. 3, 1946 |
| 2,592,014 | De Gruchy | Apr. 8, 1952 |